(12) United States Patent
Hermann et al.

(10) Patent No.: US 8,241,772 B2
(45) Date of Patent: Aug. 14, 2012

(54) INTEGRATED BATTERY PRESSURE RELIEF AND TERMINAL ISOLATION SYSTEM

(75) Inventors: Weston Arthur Hermann, Palo Alto, CA (US); Scott Ira Kohn, Redwood, CA (US); Clay Hajime Kishiyama, San Francisco, CA (US); Kurt Russell Kelty, Palo Alto, CA (US); Jeffrey Brian Straubel, Menlo Park, CA (US); Vineet Haresh Mehta, Mountain View, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 491 days.

(21) Appl. No.: 12/460,279

(22) Filed: Jul. 15, 2009

(65) Prior Publication Data
US 2010/0316894 A1 Dec. 16, 2010

Related U.S. Application Data

(63) Continuation-in-part of application No. 12/459,721, filed on Jul. 7, 2009, now Pat. No. 8,088,511, which is a continuation-in-part of application No. 12/456,150, filed on Jun. 12, 2009, now Pat. No. 8,057,928.

(51) Int. Cl.
*H01M 2/12* (2006.01)

(52) U.S. Cl. ............................ 429/56; 429/61; 429/178
(58) Field of Classification Search .................... 429/56
See application file for complete search history.

(56) References Cited

U.S. PATENT DOCUMENTS

| | | | |
|---|---|---|---|
| 6,440,599 B1 * | 8/2002 | Takada et al. ........... | 429/56 |
| 6,632,559 B1 * | 10/2003 | Kawamura et al. ....... | 429/56 |
| 7,572,544 B2 * | 8/2009 | Kozuki et al. ........... | 429/53 |
| 2002/0081482 A1 * | 6/2002 | Takada et al. ........... | 429/53 |

* cited by examiner

*Primary Examiner* — John S Maples
(74) *Attorney, Agent, or Firm* — Patent Law Office of David G. Beck

(57) ABSTRACT

A system for integrating the venting feature of a battery with a means for simultaneously disconnecting the cell from the battery pack, thereby isolating the cell, is provided. The provided battery interconnect system is comprised of a battery, a connector plate for electrically coupling the battery to a battery pack, and an interruptible electrical connector for electrically coupling the connector plate to a battery terminal vent. The vent, defined by scoring on the battery terminal, ruptures when the internal battery pressure exceeds the predefined battery operating range, causing the interruptible electrical connector to break and disrupt electrical continuity between the connector plate and the battery terminal.

16 Claims, 14 Drawing Sheets

INTEGRATED BATTERY PRESSURE RELIEF AND TERMINAL ISOLATION SYSTEM

CROSS-REFERENCES TO RELATED APPLICATIONS

This application is a continuation-in-part of U.S. patent application Ser. No. 12/459,721, filed Jul. 7, 2009, now U.S. Pat. No. 8,088,511, which is a continuation-in-part of U.S. patent application Ser. No. 12/456,150, filed Jun. 12, 2009, now U.S. Pat. No. 8,057,928, the disclosures of which are incorporated herein by reference for any and all purposes.

FIELD OF THE INVENTION

The present invention relates generally to battery cells and, more particularly, to a means of providing battery isolation within a battery pack when the cell pressure exceeds the intended operating range for the cell.

BACKGROUND OF THE INVENTION

Batteries have been used for decades to supply power to a variety of different electrical and electro-mechanical devices. Early batteries, referred to as disposable batteries, were simply used until depleted and then discarded and replaced with one or more new batteries. A newer type of battery, referred to as a rechargeable or secondary battery, is capable of being recharged and then reused, therefore offering economic, environmental and ease-of-use benefits compared to a disposable battery.

In a conventional secondary battery, the cap assembly is relatively complex as it is designed to incorporate multiple safety mechanisms. One such safety mechanism is a current interrupt device or CID. The purpose of the CID is to break the electrical connection between the electrode assembly contained within the cell and one of the cell's terminals if the pressure within the cell exceeds a predetermined level. Typically such a state of over pressure is indicative of the cell temperature increasing beyond the intended operating range of the cell, for example due to an extremely high external temperature or due to a failure within the battery or charging system. In addition to disrupting the electrical connection to the electrode assembly, the CID is commonly designed to operate in conjunction with a safety vent integrated within the cap assembly, thereby allowing the built-up gas from the over pressure event to escape the cell.

Another safety mechanism typically incorporated into the cap assembly of a conventional secondary battery is a positive temperature coefficient (PTC) current limiting element. The PTC element is designed such that its resistance becomes very high when the current density exceeds a predetermined level, thereby limiting short circuit current flow.

Although a conventional secondary battery may include multiple safety features, these features are not specifically designed to work in cooperation with whatever housing is eventually used with the battery. Typically such battery housings are designed to accommodate anywhere from a few batteries, e.g., computer battery packs, to hundreds or even thousands of batteries, e.g., hybrid or electric car battery packs. The batteries contained within these housings may be positioned end-to-end, side-by-side, or in some other arrangement. As such, the safety features incorporated into the individual batteries may work as desired or they may have adverse effects on neighboring batteries, for example venting directly into an adjacent battery, thus potentially leading to propagation of the initial battery failure.

Accordingly, what is needed is a battery and a battery pack designed to work together in a cooperative fashion to provide enhanced system performance. The present invention provides such a system.

SUMMARY OF THE INVENTION

The present invention provides a system for integrating the venting feature of a battery with a means for simultaneously disconnecting the cell from the battery pack, thereby isolating the cell. The provided battery interconnect system is comprised of a battery, a connector plate for electrically coupling the battery to a battery pack, and an interruptible electrical connector for electrically coupling the connector plate to the battery terminal via a battery terminal vent, where the battery terminal is either integrated within the battery cap assembly or corresponds to an exterior battery case surface. The vent, defined by scoring on the battery terminal, ruptures when the internal battery pressure exceeds the predefined battery operating range, causing the interruptible electrical connector to break and disrupt electrical continuity between the connector plate and the battery terminal. The interruptible electrical connector may be ultrasonically welded or resistance welded to the connector plate and the terminal vent. The interruptible electrical connector may include a scored region that defines the location where the interconnect breaks when the vent ruptures. The interruptible electrical connector may include a mechanically thinned region that defines the location where the interconnect breaks when the vent ruptures. The interruptible electrical connector may be at least partially covered by an electrically non-conductive coating. The battery interconnect system may further comprise an electrically non-conductive potting material that covers at least the portion of the terminal that includes the vent and at least a portion of the interruptible electrical connector coupled to the vent. The battery interconnect system may further comprise a support substrate comprised of an electrically non-conductive material, where the support substrate separates the connector plate from the battery. The support substrate may completely overlap the scoring on the terminal, or only a portion of the scoring, or none of the scoring. The battery interconnect system may further comprise an interconnect coupling layer interposed between the terminal and the support substrate, the coupling layer being comprised of an electrically conductive material. The interruptible electrical interconnect is coupled to the interconnect coupling layer at a location between the first end of the interconnect that is coupled to the vent and the second end of the interconnect that is coupled to the connector plate In at least one embodiment of the invention, the vent includes a first portion and a second portion, wherein the first portion ruptures when the internal battery pressure exceeds the predefined battery operating range and the second portion defines a vent hinge that remains intact when the internal battery pressure exceeds the predefined battery operating range. The interruptible electrical connector is coupled to the connector plate at a location distant from the vent hinge, causing the interruptible electrical connector to pass over the first portion of the vent. The scoring on the battery terminal may be in the form of an arc, where the arc defines the first portion of the vent and where the second portion of the vent is unscored and located between the first and second arc ends. The scoring on the battery terminal may have a variable depth and be in a substantially circular form, where the deepest portion of the scoring defines the first portion of the vent and the shallowest portion of the scoring defines the second portion of the vent.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figure 1A:
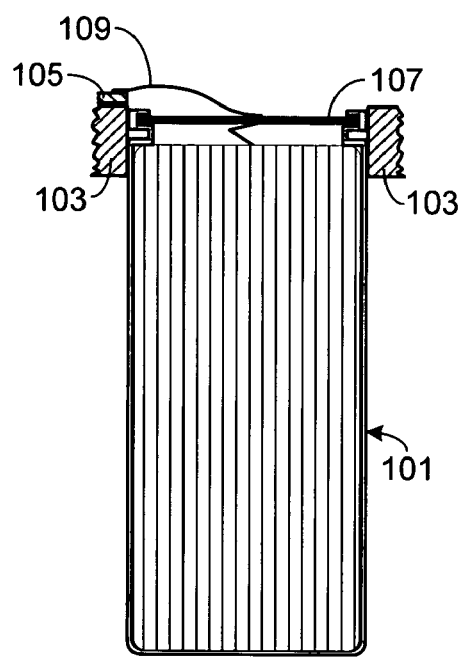
FIGS. 1A and 1B schematically illustrate the operation of the present invention.
Figure 1B:
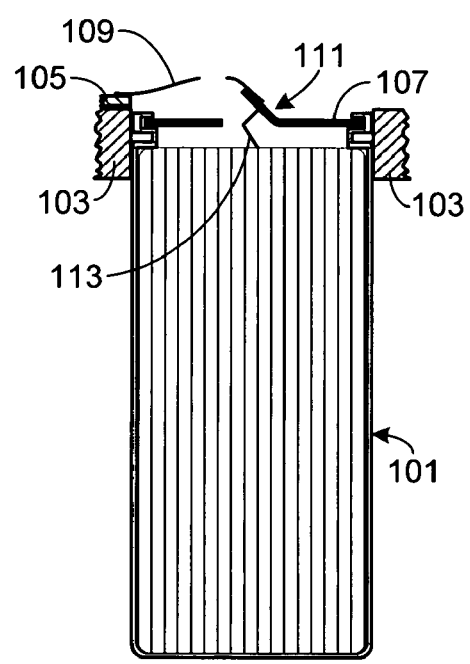

FIGS. 1A and 1B schematically illustrate the operation of the present invention using a simplified view of a battery 101 and a portion of a battery support substrate 103 and a connector plate 105. Battery terminal 107 of battery 101 is electrically connected to connector plate 105 via interruptible electrical interconnect 109. It will be appreciated that while FIGS. 1A and 1B only illustrate a single cell, preferably a battery pack designed in accordance with the invention would house a plurality of cells, all coupled as illustrated. As such, preferably the battery support substrate (e.g., substrate 103) is used to rigidly hold a plurality of batteries in place within such a battery pack and prevent inadvertent contact between adjacent batteries/conductors while the connector plate (e.g., plate 105) is used to electrically couple to the plurality of batteries. Additionally, in many applications it is envisioned that a similar support substrate and conductor plate will be used in conjunction with the second battery terminal located, for example, at the second, distal end portion of battery 101. Battery mounting systems that can be modified to utilize the presently disclosed interconnect system are described in co-pending U.S. patent application Ser. Nos. 11/353,648, filed Feb. 13, 2006; 11/414,050, filed Apr. 27, 2007; and 11/731,574, filed Mar. 20, 2007; the disclosures of which are incorporated herein by reference for any and all purposes.

As described in further detail below, battery 101 is designed to vent through terminal 107. In particular, region 111 of terminal 107 is designed to rupture during an over pressure event. By coupling interconnect 109 to region 111, and through the proper design of terminal 107 and vent region 111, when cell 101 vents, sufficient force is applied to interconnect 109 to break it as shown in FIG. 1B. As a result of breaking interconnect 109, cell 101 is isolated from the rest of the battery pack (not shown). For those instances in which the over pressure event is due to the cell's connection to the battery pack, for example due to an over-charging condition, cell isolation terminates the source of the over pressure event. Alternately, in those instances when the over pressure event is not due to the cell's connection to the battery pack, for example due to cell overheating or an internal short, the cell is most likely damaged and therefore its isolation from the rest of the battery pack is desirable. It should be understood that although FIG. 1B shows electrode tab 113 remaining intact after venting, this tab may actually be broken.

The present invention can utilize any of a variety of different cell designs. The primary constraint placed on the design of a cell used with the invention is that the region of the terminal to which the electrical interconnect is coupled ruptures during an over pressure event and, more particularly, ruptures in one of the ways described in detail below. FIGS. 2-7 illustrate a few exemplary cell designs, each of which shows a portion of an interconnect for the sake of clarity (e.g., interconnect 109 in FIGS. 2-4 and interconnects 109 and 503 in FIGS. 5-7). It should be understood that these are only exemplary cell designs and that the invention can utilize other cell designs.

Figure 2:
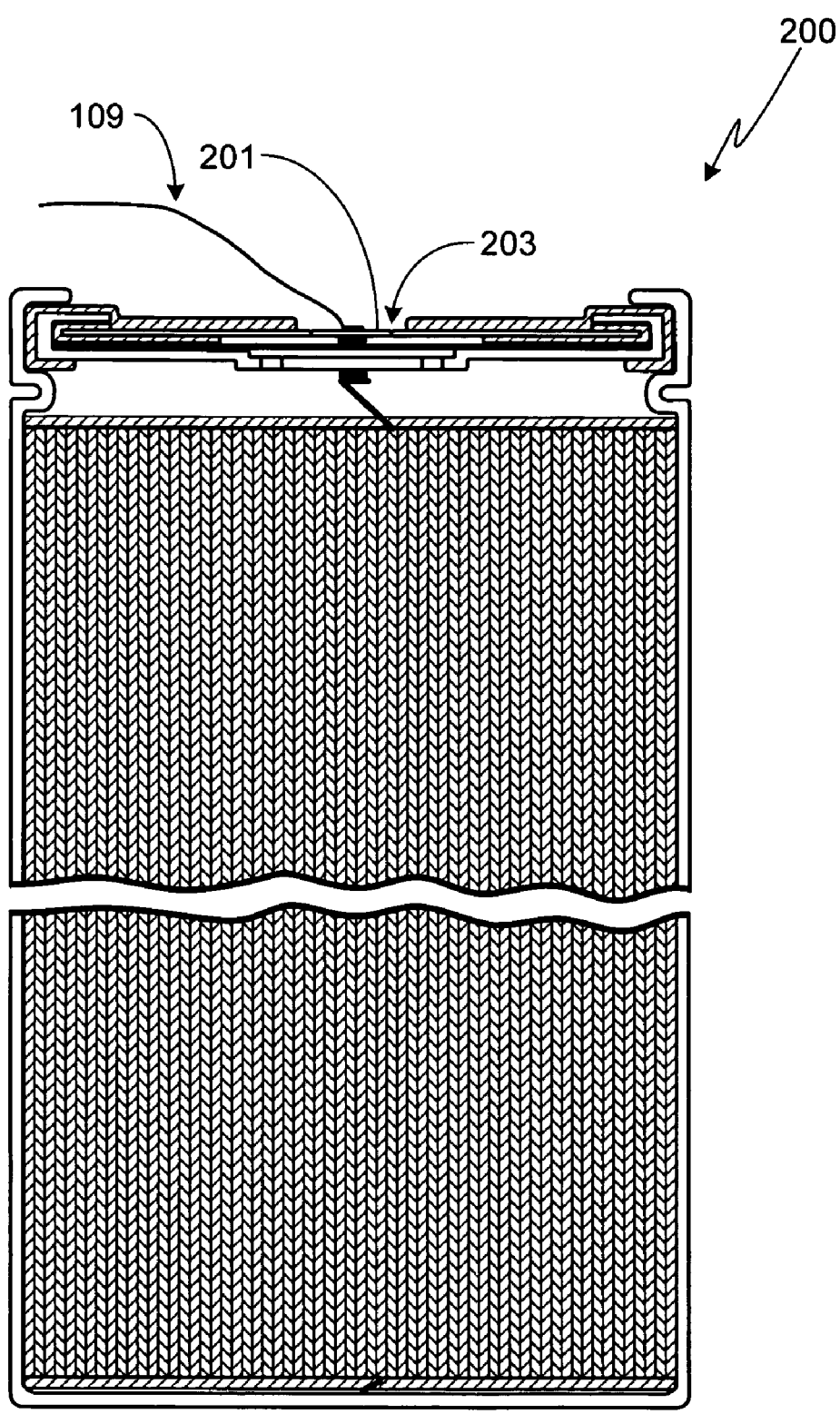
FIG. 2 is a cross-sectional view of an exemplary cell design that can be used with the invention.
Figure 3:
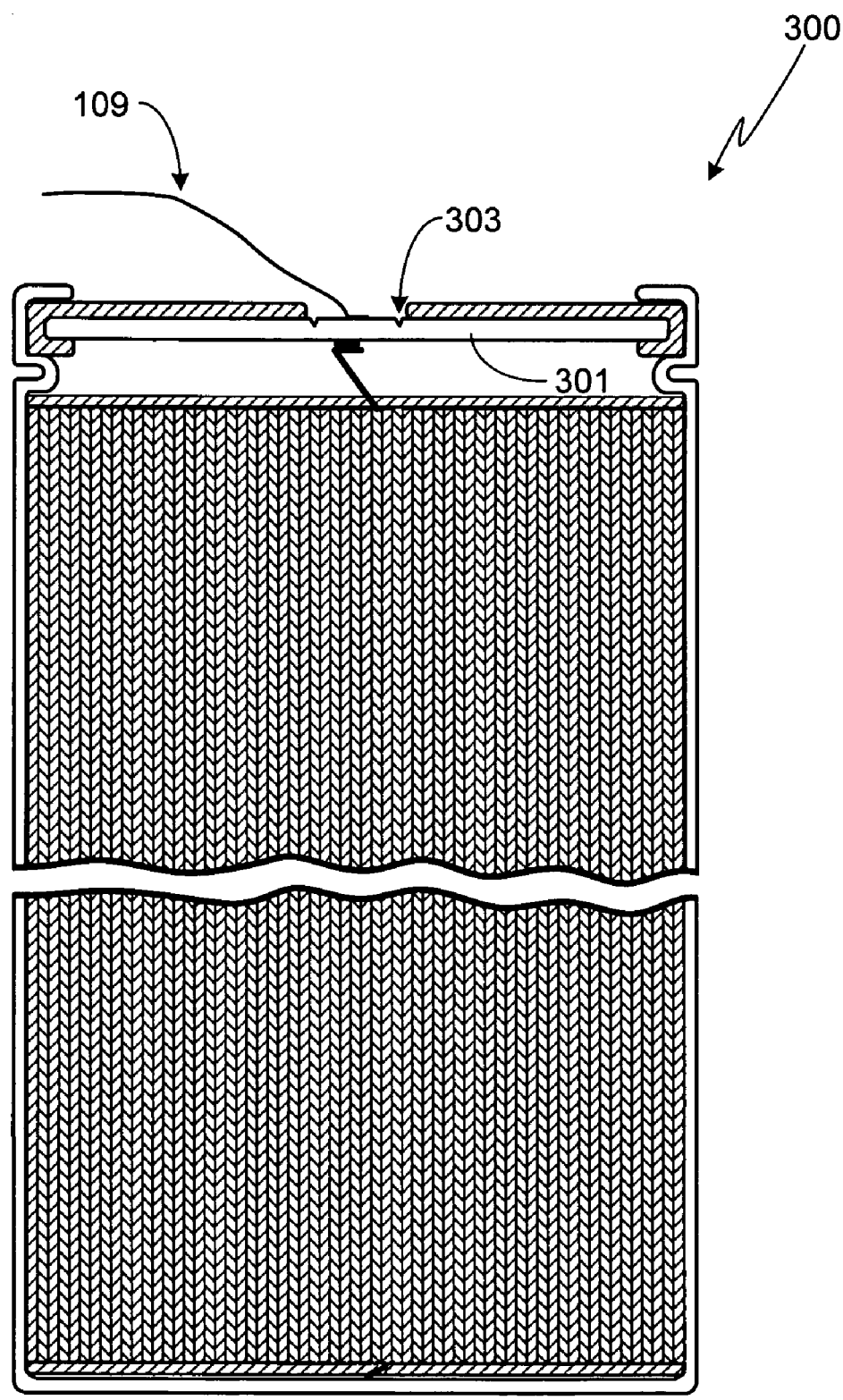
FIG. 3 is a cross-sectional view of an alternate exemplary cell design that can be used with the invention.
Figure 4:
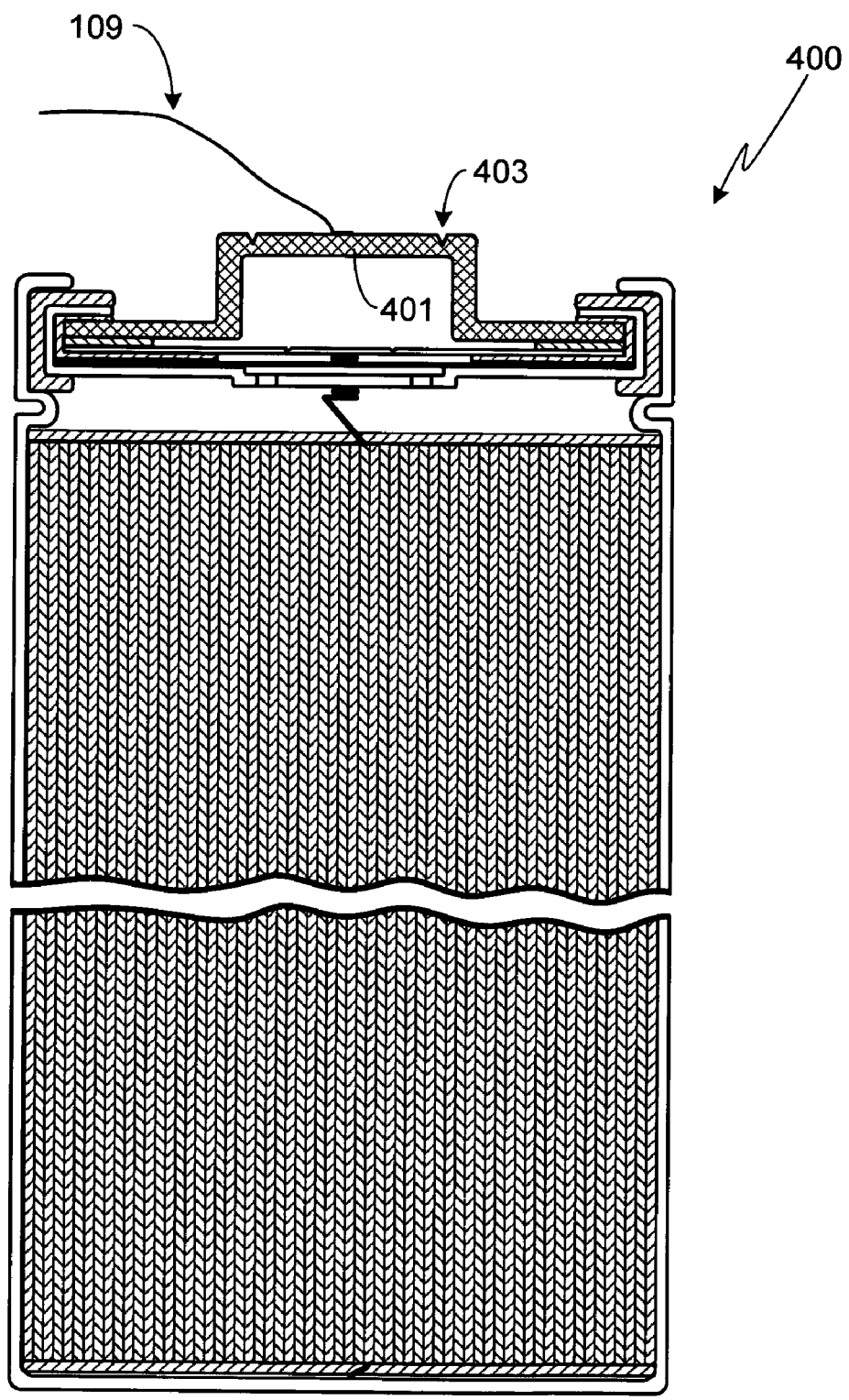
FIG. 4 is a cross-sectional view of an alternate exemplary cell design that can be used with the invention.

In the cell shown in FIG. 2, a single element 201 acts as both the cell terminal and the safety vent. Terminal 201 includes scoring 203 to facilitate venting. This cell design along with other applicable designs is described in detail in co-pending U.S. patent application Ser. No. 12/456,150, filed Jun. 12, 2009, the disclosure of which is incorporated herein by reference for any and all purposes. A similar cell design in which a single element 301 acts as both the cell terminal and the safety vent element is shown in FIG. 3. In this design, however, both the CID and the PTC elements have been eliminated. Terminal 301 includes scoring 303 to facilitate venting. This cell design along with other applicable designs is described in detail in co-pending U.S. patent application Ser. No. 12/459,721, filed Jul. 7, 2009, the disclosure of which is incorporated herein by reference for any and all purposes. Alternately, a more conventional cell design can be used with the invention, for example one employing a conventional raised battery terminal 401 as shown in FIG. 4. Cell 400 includes scoring, for example scoring 403 around the raised portion of the terminal, thus insuring that the portion of the terminal to which interconnect 109 is coupled moves sufficiently, and in the desired direction, during a venting event to break interconnect 109.

Figure 5:
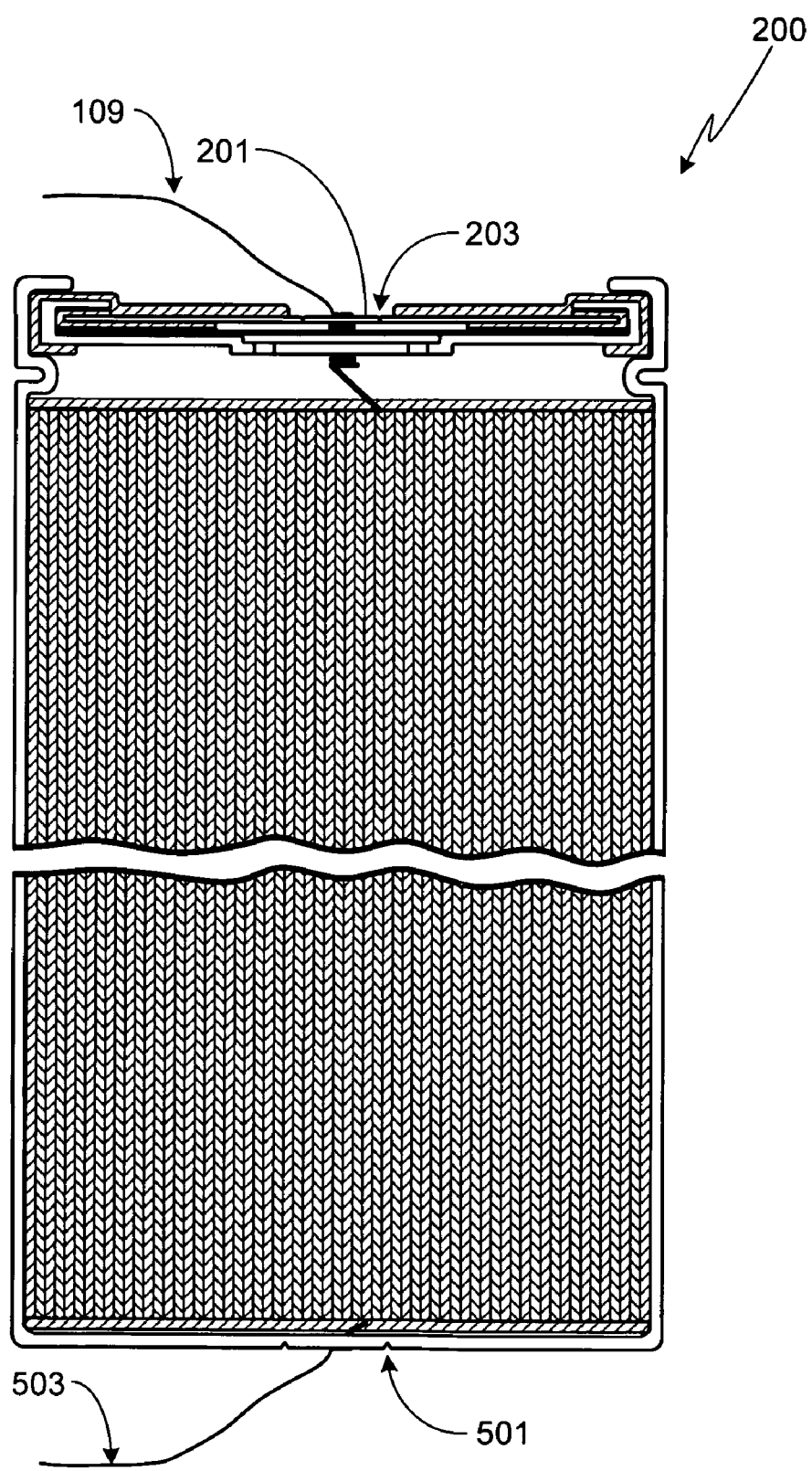
FIG. 5 is a cross-sectional view of an alternate exemplary cell design that can be used with the invention.
Figure 6:
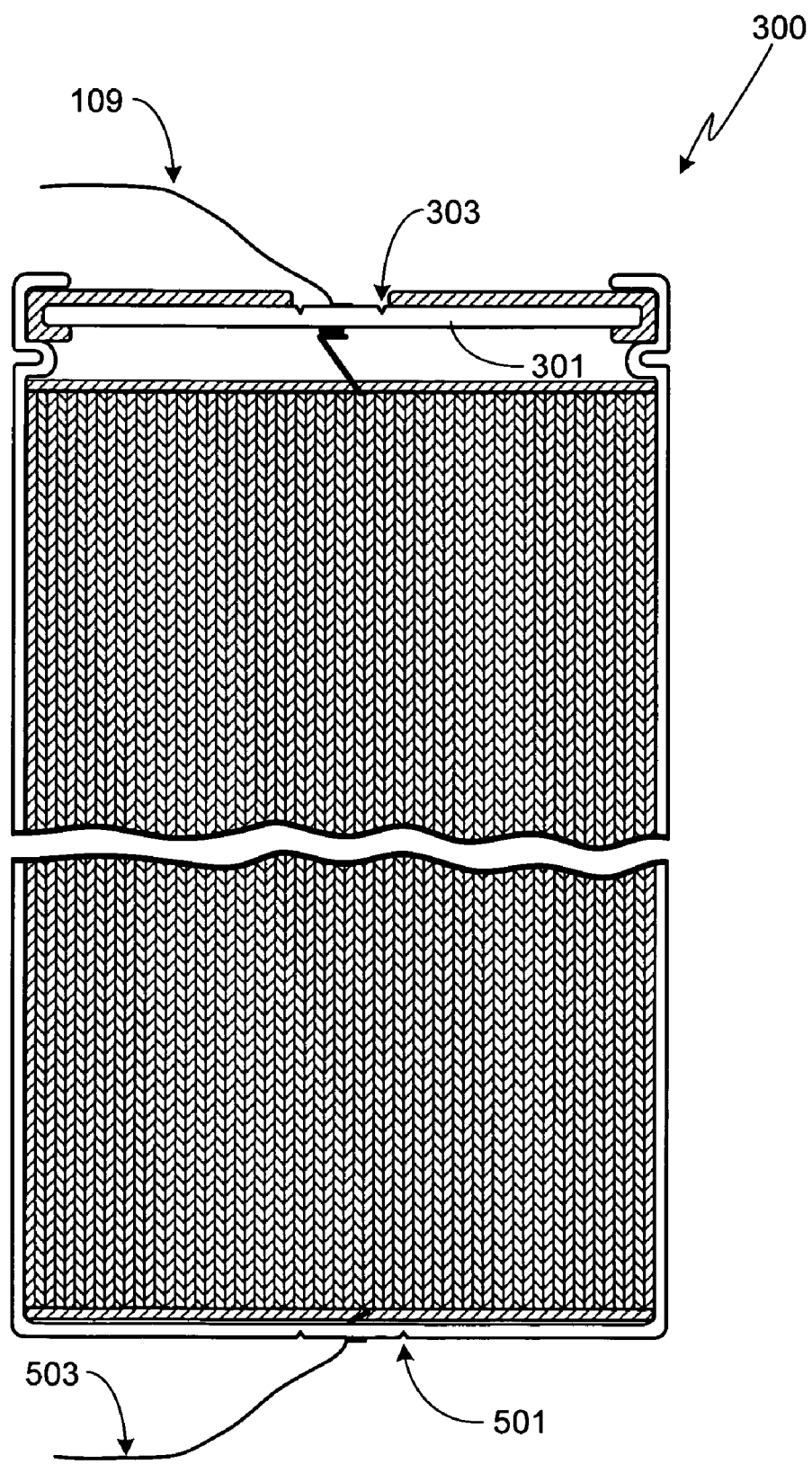
FIG. 6 is a cross-sectional view of an alternate exemplary cell design that can be used with the invention.
Figure 7:
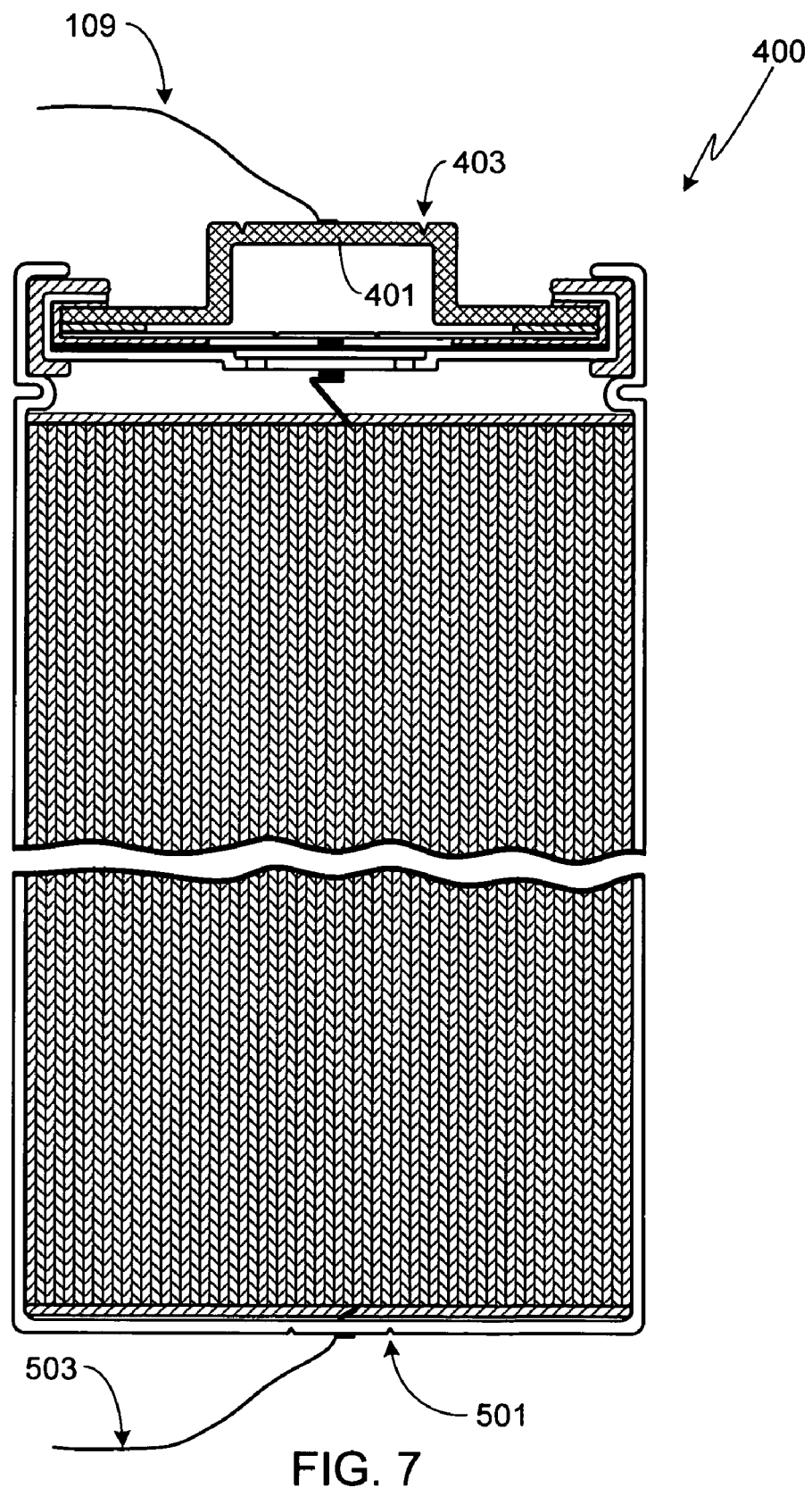
FIG. 7 is a cross-sectional view of an alternate exemplary cell design that can be used with the invention.

Although the cell designs illustrated in FIGS. 2-4 show interconnect 109 coupled to the positive cell terminal, it should be understood that the invention is not limited to the use of this terminal. For example, the negative cell terminal of any of the previous cell designs can be used with the invention, as long as the region to which the interconnect is coupled is scored as described to promote venting. FIGS. 5-7 provide alternate views of cells 200-400, respectively, in which the bottom cell surface is scored (e.g., scoring 501) to facilitate controlled venting and the breakage of corresponding interconnect 503. It will be appreciated that although FIGS. 5-7 illustrate a pair of interruptible interconnects (e.g., interconnects 109 and 503) coupled to the cell terminals along with corresponding vent regions, the invention can be used with a single interruptible interconnect coupled to either terminal, i.e., as shown in FIGS. 2-4 or utilizing only interruptible interconnects 503 shown in FIGS. 5-7).

Figure 8:
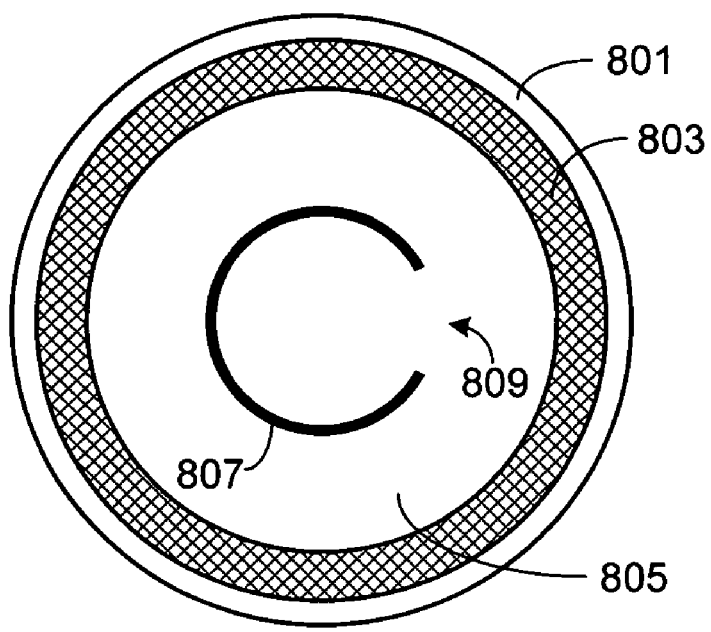
FIG. 8 provides a top view of a cell and the arc scoring that defines the terminal vent.

In one embodiment of the invention, the scoring on the terminal/vent is in the form of an arc, for example a 300 degree arc, as illustrated in FIG. 8. It will be appreciated that there are a variety of methods for scoring a metal surface that are well known by those of skill in the art, e.g., laser scribe, mechanical scribe, stamping, etc., and therefore further discussion of the means used to score the terminal/vent are not provided herein. Additionally, it should be noted that although scoring prior to battery pack assembly is preferred, the scoring process may be performed after assembly, for example using a laser scribe or similar means. Scoring after assembly has the advantage of eliminating the need to orient the battery prior to assembly to ensure that the vent ruptures in the correct direction relative to the interconnect.

Figure 9:
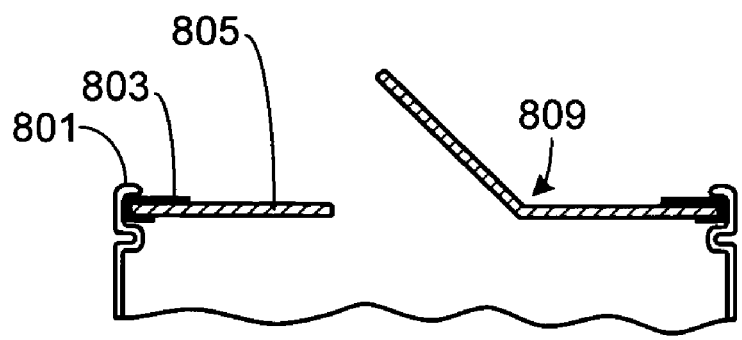
FIG. 9 is a cross-sectional view of the terminal vent of FIG. 8, FIG. 9 illustrating the vent hinge after the vent has ruptured.

FIG. 8 provides a top view of the positive terminal of a cell, such as the cell shown in FIGS. 2 and 3, although as previously noted the scoring described relative to FIG. 8 can be used with other cell designs and/or the negative terminal of the cell. In the illustration, the upper-most, crimped-over portion 801 of the cell is shown, along with the insulating gasket 803 and the terminal/vent plate 805. Due to the arc design of scoring 807, during cell venting a hinge feature is created at region 809. This hinge feature is shown in FIG. 9, this figure providing a cross-sectional view of the upper portion of the cell shown in FIG. 8 during, or after, the rupturing of the vent. It will be appreciated that as the purpose of FIG. 9 and subsequent figures is to illustrate various aspects of the battery interconnect system of the invention, these figures include incomplete representations of the illustrated batteries. For example, FIG. 9 does not show the inner cell electrode assembly, electrode tabs coupling the electrode assembly to the terminals, or other battery features.

Figure 10:
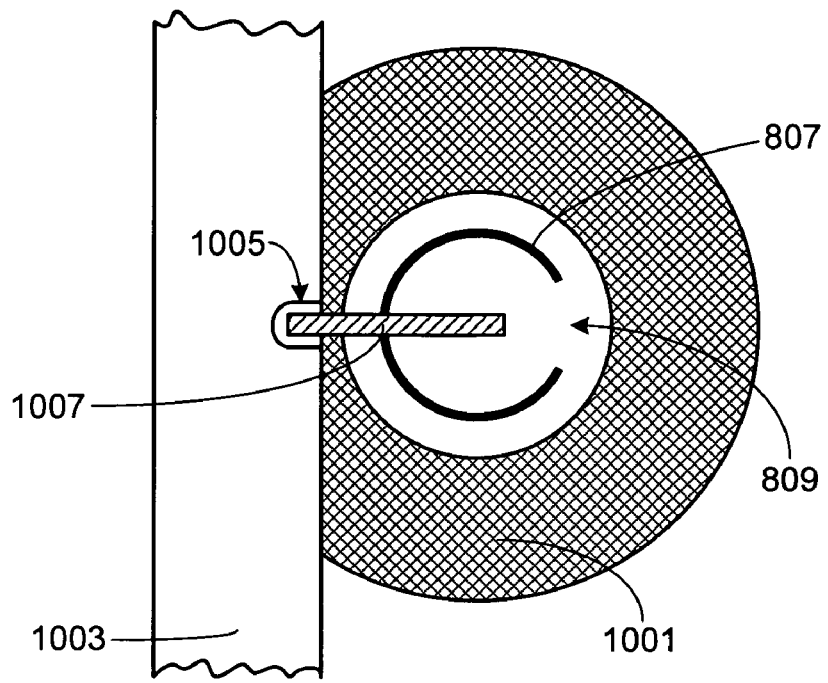
FIG. 10 provides a top view of the cell of FIG. 8, with the inclusion of the support substrate, the connector plate and the interruptible electrical interconnect.
Figure 11:
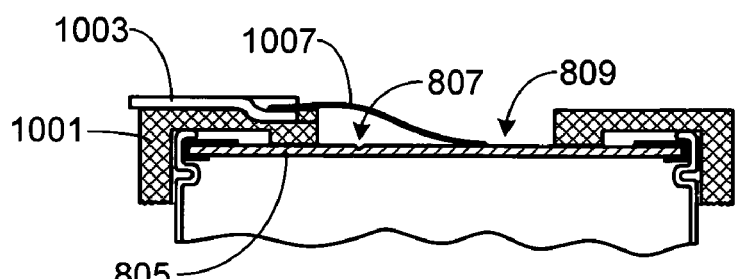
FIG. 11 is a cross-sectional view of the assembly shown in FIG. 10 prior to the vent rupturing.
Figure 12:
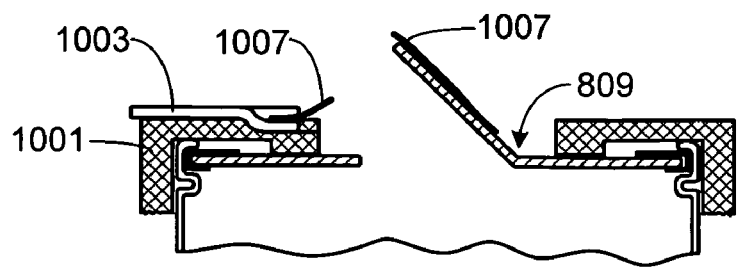
FIG. 12 is a cross-sectional view of the assembly shown in FIG. 10 after the vent has ruptured and the electrical interconnect has broken.

To ensure that the interconnect breaks, rather than bends, during cell venting it is important that the interruptible electrical interconnect be attached to the conductor plate at a location that promotes interconnect breakage. For example, in the embodiment illustrated in FIGS. 8 and 9 the interconnect is coupled to the conductor plate at a location directly across from, or substantially away from, hinge region 809. This aspect is illustrated in FIGS. 10-12 in which the battery structure shown in FIGS. 8 and 9 is overlaid with a mounting substrate 1001 and a connector plate 1003. Mounting substrate 1001 may also be referred to herein as a support substrate. Although not required in this embodiment of the invention, the use of mounting substrate 1001 is preferred as it provides a means for holding the battery in place within the battery pack. Additionally, by fabricating substrate 1001 from an electrically non-conductive material, it prevents inadvertent contact between connector plate 1003 and the battery terminal. It should be understood that only a portion of support substrate 1001 and connector plate 1003 are shown in the figures, the portions shown being sufficient to illustrate the invention. In a typical battery pack, both the support substrate and the connector plate may be shaped differently, their shapes based on the battery configuration within the pack as well as manufacturing preferences, weight and material constraints, etc.

In at least one preferred embodiment, substrate 1001 and connector plate 1003 are indented at location 1005, this location defining the point of contact for interruptible electrical interconnect 1007. As shown, interconnect 1007 is mounted to connector plate 1003 at a location distant from (i.e., substantially opposite from) hinge region 809. As a result, when the battery undergoes an over pressure event, i.e., switches from normal operation (FIG. 11) to over pressure (FIG. 12), the vent plate ruptures and hinges about hinge region 809, causing the breakage of interconnect 1007.

Preferably interconnect 1007 is a wire bond comprised of any suitable, electrically conductive material. In at least one preferred embodiment, interconnect 1007 is fabricated from aluminum. Typically resistance welding or ultrasonic welding is used to weld interconnect 1007 to connector plate 1003 and the battery terminal/vent.

Figure 13:
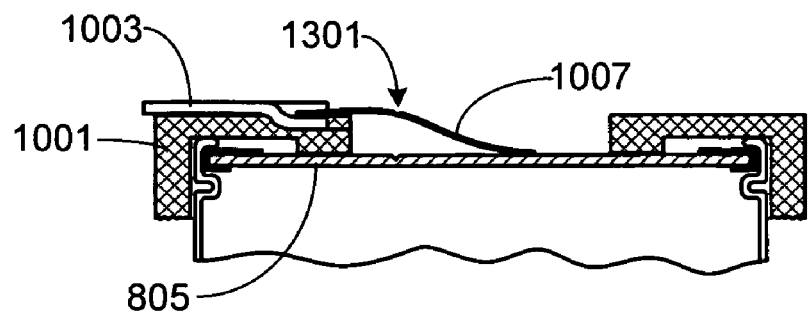
FIG. 13 illustrates an interruptible electrical interconnect with scoring to promote interconnect breakage.

In at least one embodiment of the invention, the frangible interconnect includes a region that is weakened, thus promoting breakage. For example, in FIG. 13 interconnect 1007 is scored at a location 1301, thus promoting breakage at this location. Alternately, region 1301 of interconnect 1007 may be thinned or otherwise weakened using any of a variety of techniques including, but not limited to, etching, drawing, and mechanical thinning. Regardless of the technique used to create region 1301 of interconnect 1007, and of the material used to fabricate interconnect 1007, clearly the interconnect and region 1301 must be capable of passing the desired level of current without significant heating.

Figure 14:
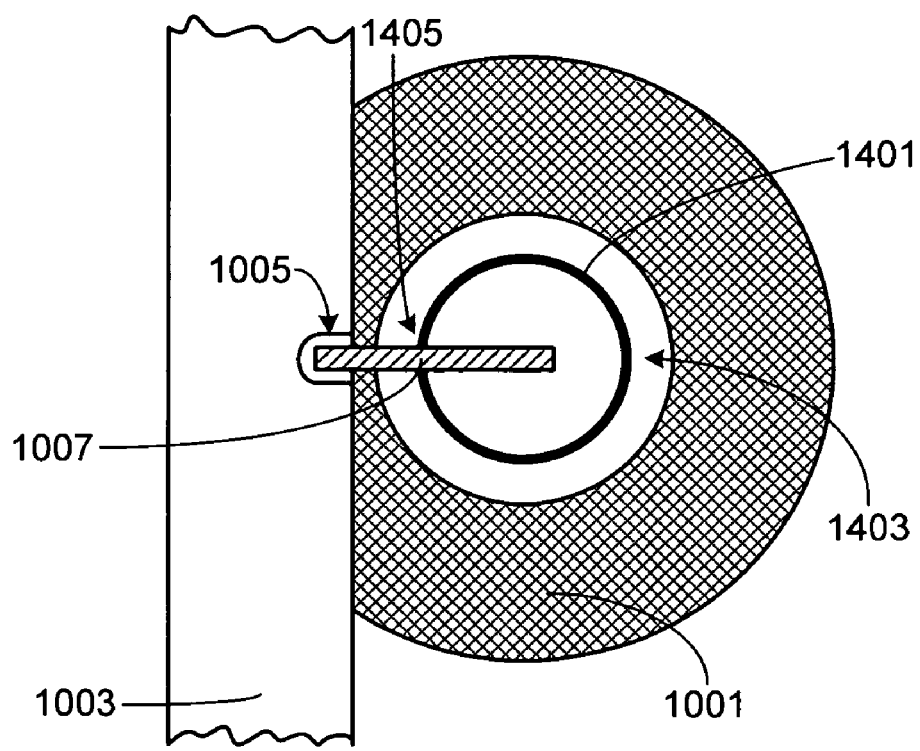
FIG. 14 is a top view of an assembly similar to that shown in FIG. 10 except that the scoring that defines the terminal vent has a substantially circular form.

In an alternate embodiment of the invention, depth-variable scoring is used to define the hinge region, or enhance its performance, and thus insure interconnect breakage. If the scoring is in the shape of an arc, as shown in FIG. 10, the region of the arc furthest from hinge region 809 has the deepest scoring. Alternately, the scoring may have a circular or substantially circular form, as illustrated in FIG. 14. In this embodiment, the shallowest region of scoring 1401 is at a location 1403 while the deepest scoring is at a location 1405. As a result of the depth-variable scoring, the vent either hinges about region 1403 or ruptures initially at location 1405 with the rupture propagating along the scoring such that location 1403 ruptures last.

Figure 15:
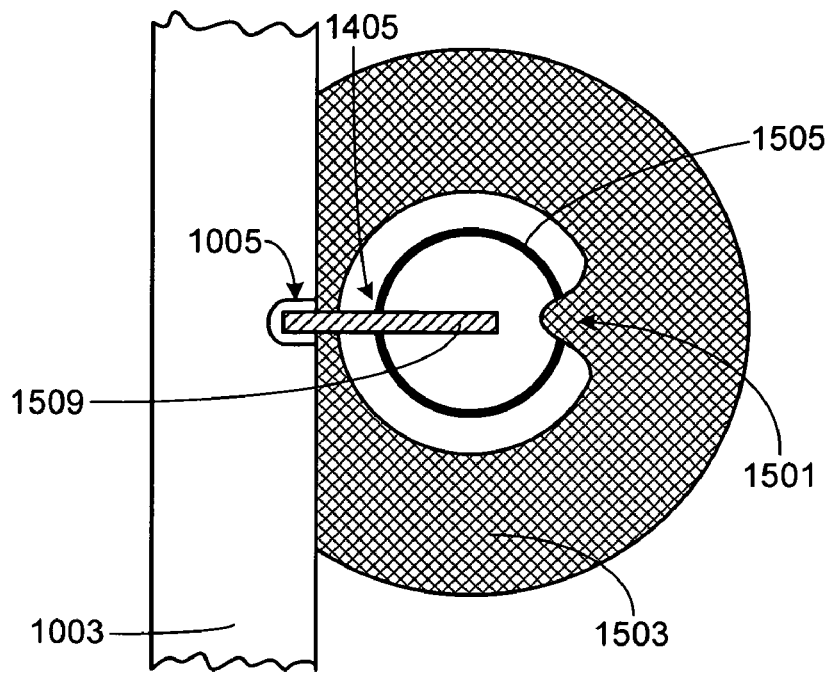
FIG. 15 is a top view of an assembly similar to those shown in FIGS. 10 and 14 in which a portion of the support substrate extends over a small portion of the terminal vent, thereby defining a vent hinge/rupture pattern.
Figure 16:
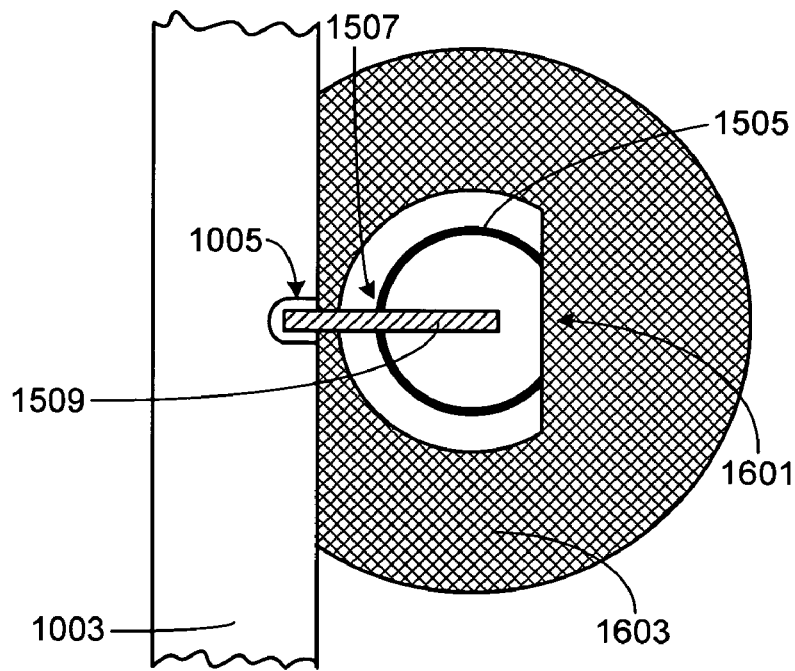
FIG. 16 is a top view of an assembly similar to that shown in FIG. 15 with an alternate support substrate design.

Although scoring may be used to not only define the vent region, but also the direction of vent rupture as described above, in at least one alternate embodiment the battery mounting structure, e.g., the support substrate, is used to bias the vent failure in the desired direction, thereby ensuring interconnect breakage during cell venting. Preferably in such an embodiment, terminal/vent scoring is circular with a continuous depth, thus allowing the cells to be positioned within the battery pack during assembly without consideration of the cell's orientation relative to the interconnect. FIGS. 15 and 16 illustrate two configurations in which a portion of the support substrate extends beyond the vent scoring; specifically, portion 1501 of support substrate 1503 and portion 1601 of support substrate 1603 overlaps scoring 1505. As a result of the overlapping support substrate, when the vent ruptures the portion of the vent that is under the overlapping substrate is held down, causing the vent to preferentially rupture initially near region 1507 and ensure breakage of interconnect 1509.

Due to the qualities of metals (e.g., malleability), and specifically the qualities of the terminal/vent plate, once the pressure has been released from the cell there is little or no tendency for the vent to fall back towards the cell, potentially re-forming an electrical connection between the conductor plate and the battery. In some embodiments of the invention, however, additional precautions are taken to ensure that such an electrical connection is not re-formed after conclusion of the venting process. For example, in any of the previously described embodiments the electrical interconnect may be encased in a relatively brittle, and electrically non-conductive, material. This material is preferably sprayed or otherwise applied to the electrical interconnect after the interconnect has been welded to the connector plate and the battery terminal. As a result of the coating material applied to the interconnect, the likelihood of the two ends of the broken electrical interconnect re-connecting after cessation of the venting process is further reduced.

Figure 17:
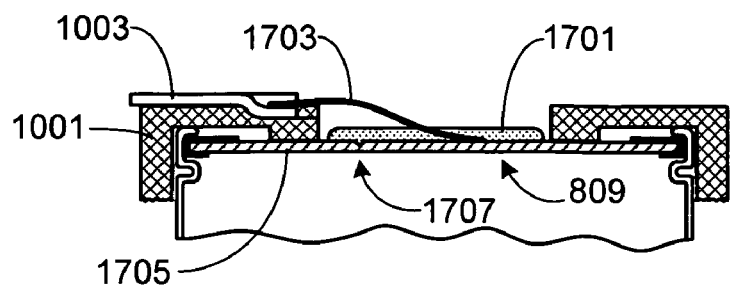
FIG. 17 is a cross-sectional view of an assembly similar to that shown in FIG. 11 that includes a potting material that covers the terminal vent.

In an alternate embodiment, after the battery has been assembled within the battery pack and the electrical interconnect has been attached, a stiff, relatively brittle and electrically non-conductive potting material is applied to the terminal/vent and at least the lower portion of the interconnect. As will be appreciated by those of skill in the art, various epoxies, potting and encapsulation materials can be used in this application. As illustrated in FIG. 17, potting/encapsulation material 1701 covers the lower portion of interconnect 1703 and at least a portion of the terminal/vent plate 1705, including scoring 1707. In addition to decreasing the likelihood of a broken interconnect reconnecting after the venting process ends, material 1701 helps to promote the initial breakage of the interconnect by reducing the slack inherent in the interconnect due to the welding/fabrication process.

Figure 18:
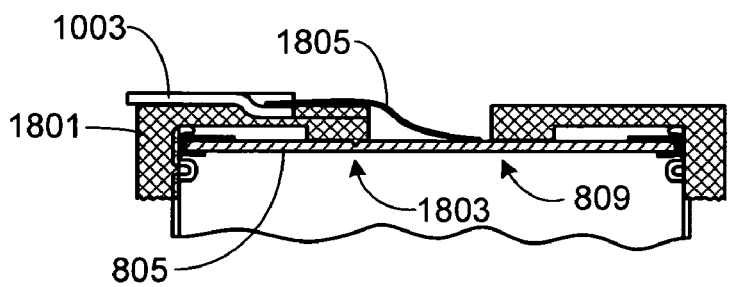
FIG. 18 is a cross-sectional view of an assembly similar to that shown in FIG. 11 in which the support substrate covers the terminal scoring.
Figure 19:
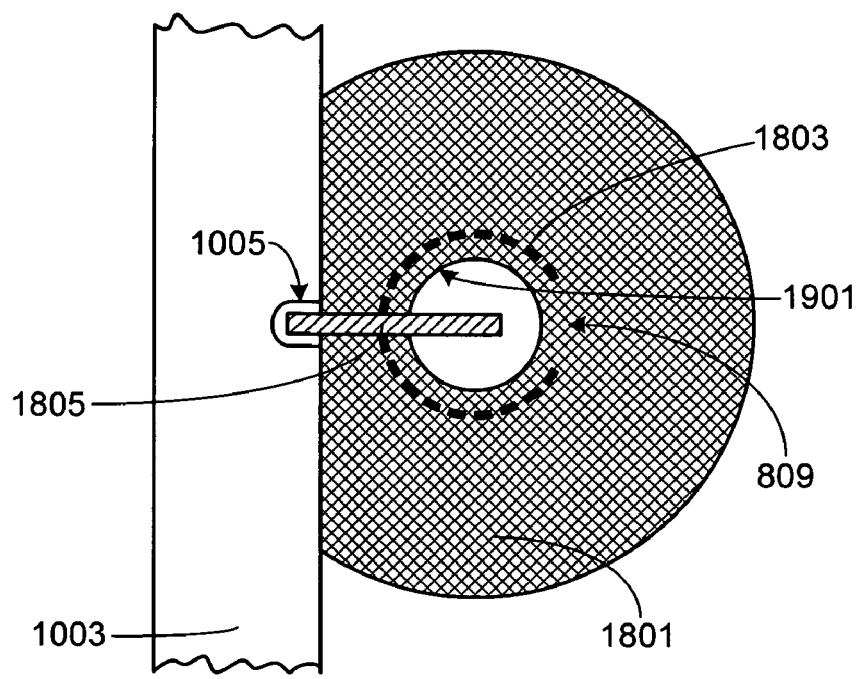
FIG. 19 provides a top view of the cell of FIG. 18.

In an alternate embodiment, illustrated in FIGS. 18 and 19, the inner edge of mounting support substrate 1801 extends beyond, i.e., overlaps, scoring 1803. Note that scoring 1803 is shown in phantom in FIG. 19. Mounting support substrate 1801 is fabricated from a deformable, electrically non-conductive material (e.g., plastic). When the cell experiences an over pressure event, the vent ruptures and hinges about region 809 as previously described. Due to the force of the venting process, the vent drives past and deforms the inner edge 1901 of substrate 1801. Because of the plastic nature of substrate 1801, the vent is held in place after cessation of the over pressure event, thereby substantially preventing re-connection of the interconnect to the connector plate.

Figure 20:
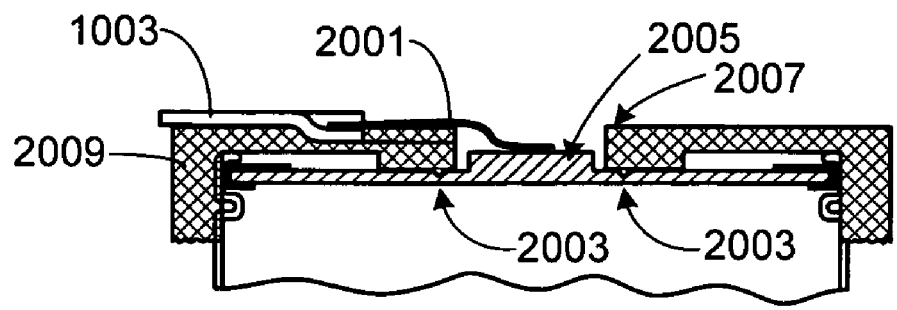
FIG. 20 is a cross-sectional view of an assembly similar to that shown in FIG. 18 utilizing a raised terminal.

In a variation of the embodiment shown in FIGS. 18 and 19, scoring 1803 forms a complete circle, thus allowing the entire vent to be ejected during an over pressure event. Due to the plastic deformable nature of substrate 1801, after venting terminates the portion of the terminal/vent plate that was ejected during venting is prevented from re-establishing electrical contact. As the entire vent is ejected, in this embodiment there exists the possibility of the interconnect bending, rather than breaking, during the venting process. One approach of ensuring that the cell becomes isolated during venting is to constrain the internal tab that couples the terminal to the electrode assembly (i.e., electrode jellyroll) contained within the cell. As a result, during venting the internal tab breaks, thereby isolating the cell from the battery pack even if the external interconnect (e.g., interconnect 1805) remains intact. Another approach is to use a cell with a raised region on the terminal/vent element as shown in FIG. 20 such that the interconnect couples to the raised region while the scoring is on the lower region of the terminal/vent. This approach allows the interconnect, i.e., interconnect 2001, to be relatively constrained. Then when the cell vents and ruptures along scoring 2003, the raised portion 2005 of the vent is ejected through over lapping portion 2007 of support substrate 2009, thereby breaking interconnect 2001.

Figure 21:
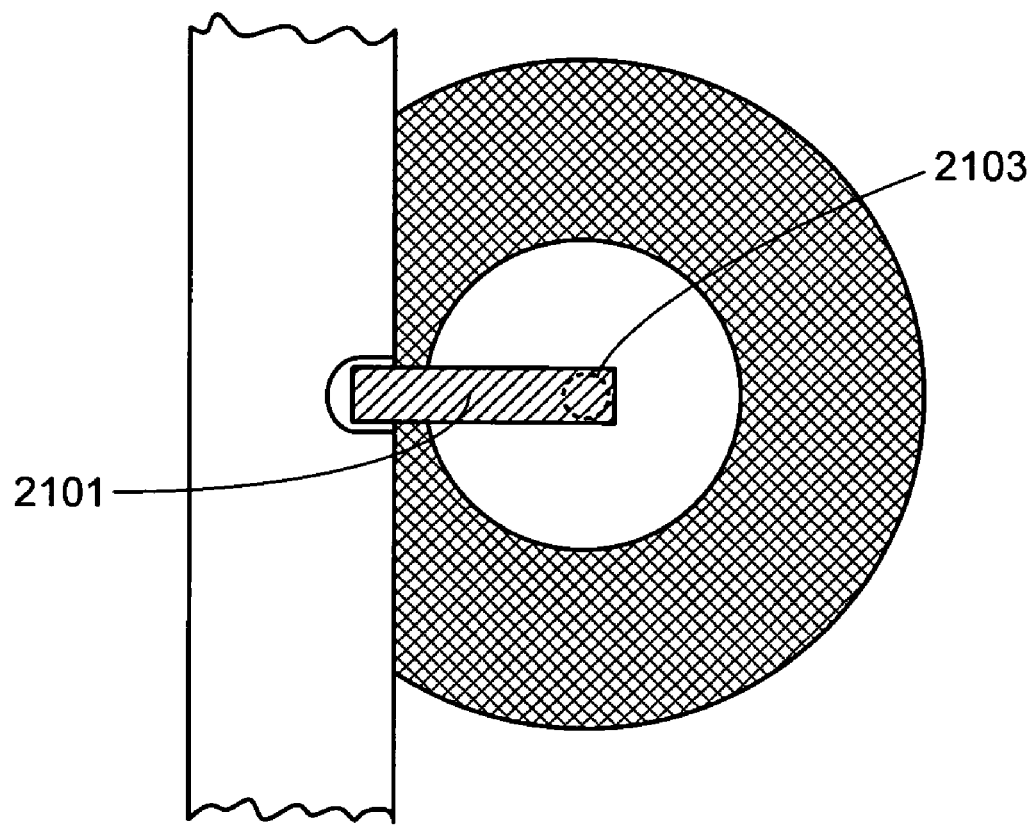
FIG. 21 is a top view of an assembly in which the electrical interconnect covers the scored vent on the terminal.

In an alternate embodiment illustrated in FIG. 21, a thin, flat interconnect 2101 is used. The end of the interconnect that is coupled to the cell terminal covers the cell vent 2103, shown in phantom in FIG. 21. During an over pressure event, the cell vents through region 2103, breaking the weld between the terminal and the interconnect, thereby isolating the cell from the battery pack. Alternately, the location of the weld between interconnect 2101 and the terminal may be located within region 2103. In this configuration when the vent is ejected, the interconnect is automatically disconnected from the cell.

Figure 22:
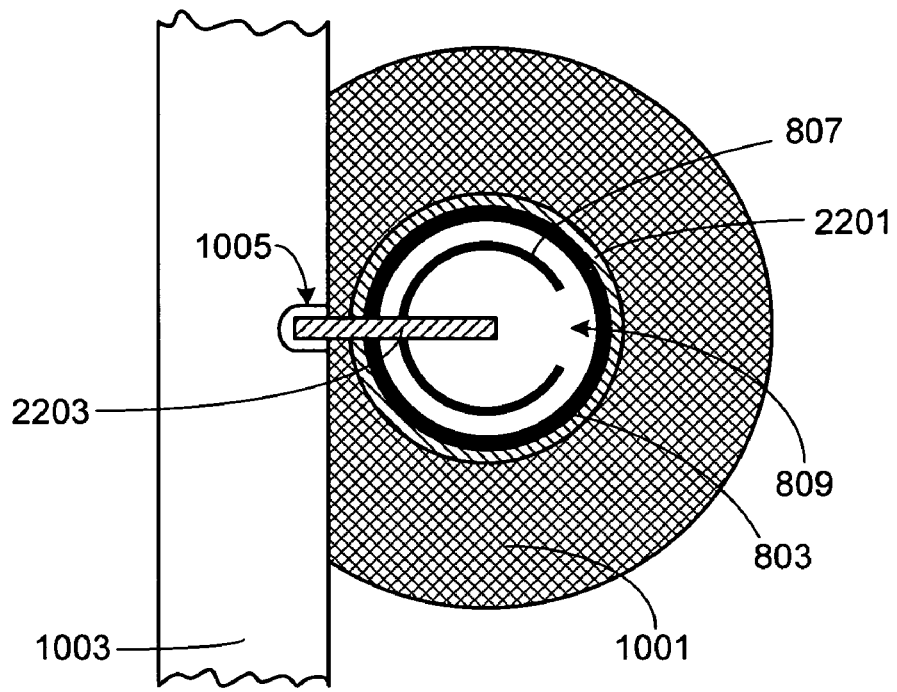
FIG. 22 is a top view of an assembly that includes an additional interconnect coupling layer to promote interconnect breakage.
Figure 23:
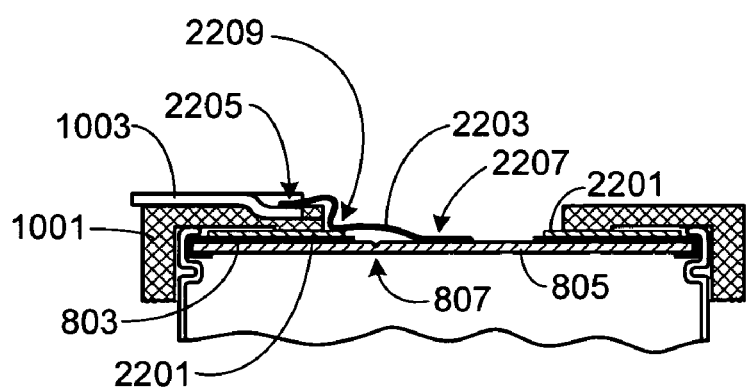
FIG. 23 is a cross-sectional view of the assembly shown in FIG. 22 prior to the vent rupturing.
Figure 24:
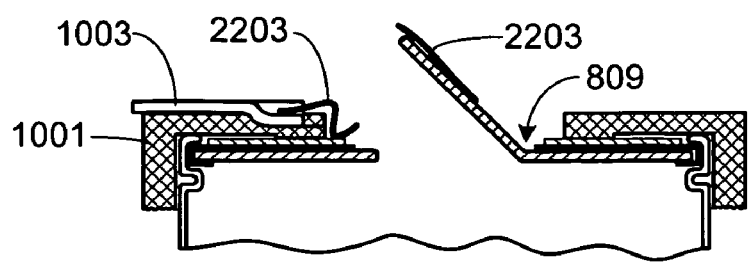
FIG. 24 is a cross-sectional view of the assembly shown in FIG. 22 after the vent has ruptured and the electrical interconnect has broken.

As previously noted, to ensure that the interruptible electrical interconnect breaks when the vent ruptures, it is important to reduce interconnect slack to the extent allowed by the design of the assembly and the manufacturing processes. FIGS. 22-24 illustrate another method of constraining interconnect movement, thereby enhancing interconnect breakage. As shown, an additional element, i.e., an interconnect coupling layer 2201, is added to the cell assembly. Due to the inclusion of interconnect coupling layer 2201, the interruptible electrical interconnect can be further constrained, specifically coupling interconnect 2203 to connector plate 1003 at a location 2205, to terminal/vent 805 at a location 2207, and to interconnect coupling layer 2201 at a location 2209. By coupling the interconnect, for example by welding, to the interconnect coupling layer 2201, much of the slack in the interconnect is removed. Additionally, and as shown, this approach decreases the length of the interconnect between the vent and the nearest point of constraint (i.e., location 2209).

It will be appreciated that interconnect coupling layer 2201 cannot be allowed to contact terminal/vent 805 except via the interruptible electrical interconnect 2203, otherwise cell isolation will not occur when the vent ruptures and the interconnect is broken. Accordingly, an electrically insulating gasket must be interposed between the terminal/vent element and the interconnect coupling layer. In at least one preferred embodiment, insulating gasket 803 is simply extended further towards the center of the cell and the vent as illustrated. Alternately, a separate insulating gasket may be interposed between the coupling layer and the terminal/vent element (not shown). It will also be appreciated that interconnect coupling layer 2201 cannot be allowed to come into electrical contact with the opposite terminal which, in the illustrated embodiment, is the cell casing. Accordingly, either an additional insulating gasket is interposed between the cell crimp and the coupling layer (not shown), or the coupling layer is sized and positioned such that it is not in contact with the cell casing (as shown). In this configuration, interconnect coupling layer 2201 is either deposited onto a portion of the upper surface of insulating gasket 803, or layer 2201 is fabricated separately, as a conductive ring, and then bonded or otherwise clamped onto the upper surface of gasket 803.

Although the use of interconnect coupling layer 2201 is illustrated on an interconnect assembly similar to that shown in FIGS. 10-12, it will be appreciated that the coupling layer can be used with any of the other configurations to further constrain the interconnect and improve interconnect frangibility.

Although the preferred embodiment of the invention is utilized with a cell using the 18650 form-factor, it will be appreciated that the invention can be used with other cell designs, shapes and configurations. Additionally, and as noted with respect to FIGS. 2-7, the present invention is designed to work with either, or both, the positive and negative cell terminals regardless of whether the terminal is part of the cap assembly or associated with the cell casing.

As will be understood by those familiar with the art, the present invention may be embodied in other specific forms without departing from the spirit or essential characteristics thereof.

What is claimed is:

1. A battery interconnect system, comprising:
   a battery, said battery comprising a terminal, wherein a portion of said terminal comprises a venting region, wherein said venting region is defined by scoring on a surface of said terminal, wherein said venting region includes a first portion that ruptures when an internal pressure of said battery exceeds a predefined operating range, wherein said venting region includes a second portion that remains intact when said internal pressure of said battery exceeds said predefined operating range, and wherein said second portion defines a vent hinge;
   a connector plate for electrically coupling said battery to a battery pack; and
   an interruptible electrical interconnect, said interruptible electrical interconnect electrically coupling said connector plate to said terminal, wherein said interruptible electrical interconnect is coupled to said venting region of said terminal, wherein said interruptible electrical interconnect is coupled to said connector plate at a location distant from said vent hinge causing said interruptible electrical interconnect to pass over said first portion of said venting region, wherein said interruptible electrical interconnect breaks and disrupts electrical continuity between said connector plate and said terminal when said venting region ruptures.

2. The battery interconnect system of claim 1, wherein said interruptible electrical interconnect is ultrasonically welded to said connector plate and ultrasonically welded to said venting region of said terminal.

3. The battery interconnect system of claim 1, wherein said interruptible electrical interconnect is resistance welded to said connector plate and resistance welded to said venting region of said terminal.

4. The battery interconnect system of claim 1, wherein said interruptible electrical interconnect includes a scored region, wherein said scored region of said interruptible electrical interconnect defines a location for said interruptible electrical interconnect to break when said venting region ruptures.

5. The battery interconnect system of claim 1, wherein said interruptible electrical interconnect includes a mechanically thinned region, said mechanically thinned region defining a location for said interruptible electrical interconnect to break when said venting region ruptures.

6. The battery interconnect system of claim 1, wherein said scoring on said portion of said terminal is in the form of an arc, said arc defining said first portion of said venting region, and wherein said second portion of said venting region is unscored and located between a first arc end and a second arc end.

7. The battery interconnect system of claim 1, wherein said scoring on said portion of said terminal has a variable depth and is in a substantially circular form, wherein a deepest portion of said variable depth scoring defines said first portion of said venting region, and wherein a shallowest portion of said variable depth scoring defines said second portion of said venting region.

8. The battery interconnect system of claim 1, further comprising an electrically non-conductive coating covering at least a portion of said interruptible electrical interconnect.

9. The battery interconnect system of claim 1, further comprising an electrically non-conductive potting material, wherein said electrically non-conductive potting material covers said portion of said terminal that includes said venting region, and wherein said electrically non-conductive potting material covers at least a portion of said interruptible electrical interconnect that is coupled to said venting region of said terminal.

10. The battery interconnect system of claim 1, further comprising a support substrate, wherein a portion of said support substrate overlaps said terminal, wherein said support substrate is comprised of an electrically non-conductive material, and wherein said connector plate is separated from said battery by said support substrate.

11. The battery interconnect system of claim 10, wherein said portion of said support substrate that overlaps said terminal also overlaps a portion of said scoring on said surface of said terminal.

12. The battery interconnect system of claim 10, wherein said portion of said support substrate that overlaps said terminal completely overlaps said scoring on said surface of said terminal.

13. The battery interconnect system of claim 10, further comprising an interconnect coupling layer interposed between said terminal and said support substrate, wherein said interconnect coupling layer is comprised of an electrically conductive material, and wherein said interruptible electrical interconnect is coupled to said interconnect coupling layer at a location between a first end portion and a second end portion of said interruptible electrical interconnect, wherein said first end portion is coupled to said venting region and said second end portion is coupled to said connector plate.

14. The battery interconnect system of claim 1, wherein an end portion of said interruptible electrical interconnect that is coupled to said venting region of said terminal completely overlaps said scored region.

15. The battery interconnect system of claim 1, wherein said terminal is integrated within a battery cap assembly.

16. The battery interconnect system of claim 1, wherein said terminal corresponds to an exterior surface of a battery casing.

\* \* \* \* \*